(12) United States Patent
Medel Cabello (10) Patent No.: US 11,766,063 B2
(45) Date of Patent: Sep. 26, 2023

(54) JUICING UNIT AND FRUIT JUICING MACHINE THAT INCLUDES SAID JUICING UNIT

(71) Applicant: Zumex Group, S.A., Moncada (ES)

(72) Inventor: Rafael Medel Cabello, Moncada (ES)

(*) Notice: Subject to any disclaimer, the term of this patent is extended or adjusted under 35 U.S.C. 154(b) by 422 days.

(21) Appl. No.: 16/757,740

(22) PCT Filed: Oct. 18, 2018

(86) PCT No.: PCT/ES2018/070683
§ 371 (c)(1),
(2) Date: Apr. 20, 2020

(87) PCT Pub. No.: WO2019/077189
PCT Pub. Date: Apr. 25, 2019

(65) Prior Publication Data
US 2021/0186080 A1   Jun. 24, 2021

(30) Foreign Application Priority Data
Oct. 20, 2017 (ES) .............................. ES201731239

(51) Int. Cl.
*A23N 1/00* (2006.01)
*A47J 19/02* (2006.01)
(Continued)

(52) U.S. Cl.
CPC .............. *A23N 1/003* (2013.01); *A23N 1/02* (2013.01); *A47J 19/02* (2013.01); *A47J 19/023* (2018.08); *B30B 9/20* (2013.01)

(58) Field of Classification Search
CPC ........... A47J 19/02; A47J 19/023; A23N 1/02; A23N 1/002; A23N 1/00
See application file for complete search history.

(56) References Cited

U.S. PATENT DOCUMENTS

| 5,170,699 A | 12/1992 | Senalada |
| 2012/0024172 A1 | 2/2012 | Pichler |

FOREIGN PATENT DOCUMENTS

| ES | 2189556 A1 | 7/2003 |
| ES | 2389890 T3 | 11/2012 |

(Continued)

OTHER PUBLICATIONS

International Search Report issued in connection with PCT Application No. PCT/ES2018/070683, dated Jan. 14, 2019.

*Primary Examiner* — Reginald Alexander
(74) *Attorney, Agent, or Firm* — Dennemeyer & Associates LLC (57) ABSTRACT

A squeezer unit (1), comprising:
two female drums (2) with an internal cavity (3), with a central shaft, which can rotate in opposite directions, comprising a number of cavities (4) to house a fruit to be squeezed,
two male drums (5) with an internal cavity (6), with a central shaft, located below the female drums (2), in such a way that each male drum (5) can rotate in a direction opposite to that of the corresponding female drum (2) located above the same, the male drums (5) comprising a number of protrusions (7) which can be coupled to the cavities (4) of the female drums (2) to squeeze out the juice,
a support (8) for the squeezer unit (1) comprising a frontal plate (9) which can be coupled to the male drums (5) and the female drums (2),
where each of the female drums (2) and the male drums (5) comprises a frontal extension (10) which is coaxial with its central axis, each frontal extension (10) being integral with the body of the corresponding drum (2, 5), and the frontal plate (9) of the support (8) of the squeezer unit (1) comprises, on its side facing the female drums (2) and the male (Continued)

drums (5), four protrusions (12, 15), in such a way that when the squeezer unit (1) is in the assembled position, the extensions (10) of the female drums (2) and the male drums (5) are coupled to the corresponding protrusions (12, 15) of the frontal plate (9) of the support (8).

11 Claims, 9 Drawing Sheets

(51) Int. Cl.
*A23N 1/02* (2006.01)
*B30B 9/20* (2006.01)

(56) References Cited

FOREIGN PATENT DOCUMENTS

| FR | 1563306 | * | 4/1969 | ............... A23N 1/00 |
|----|---------|---|--------|---------------------------|
| GB | 2216784 A | | 10/1989 | |
| WO | 2004052126 A1 | | 6/2004 | |
| WO | WO-2009093906 A1 | * | 7/2009 | ............. A23N 1/003 |
| WO | 2016059186 A1 | | 4/2016 | |
| WO | 2016093709 A1 | | 6/2016 | |

\* cited by examiner

JUICING UNIT AND FRUIT JUICING MACHINE THAT INCLUDES SAID JUICING UNIT

CROSS-REFERENCE TO RELATED APPLICATIONS

This is a 35 U.S.C. 371 National Stage Patent Application of International Application No. PCT/ES2018/070683, filed Oct. 18, 2018, which claims priority to Spanish application P201731239, filed Oct. 20, 2017, each of which is hereby incorporated by reference in its entirety.

FIELD OF THE INVENTION

The present invention relates to a squeezer unit and a fruit, principally citrus fruit, juicing machine incorporating said squeezer unit.

BACKGROUND OF THE INVENTION

Numerous proposals are known for fruit juicing machines which enable the individual squeezing of the fruits (especially citrus fruits) for the immediate, automatic production of juice (e.g. orange juice).

WO 2004/052126 A1, disclosing a "Cutting device with a movable blade for a fruit juicing machine" describes a cutting device for a machine of the type formed by two pairs of rotating drums, male and female, for the housing, the guiding toward the cutting stage and the squeezing by pressure of the two resulting halves of the fruits. The blade is disposed on a support which is displaced along a guide in a direction contrary to that of the fruits at the moment of cutting, by the pushing action exerted on the base of the same by a number of protrusions on the female drums which rotate solidarily with the squeezer heads, bringing about the ascent of the blade, the cutting thereby anticipating the separation of the two halves by the roof-shaped component and their subsequent descent due to gravity. The device of this invention enables the fruit to be squeezed to be divided cleanly, preventing tears in the peel caused by the separator component, and without spillage.

ES 2189556 A1 relates to an improved juicing machine for oranges and similar fruits, comprising a first carousel with a plurality of peripheral receptacles into which corresponding oranges are accommodated and which, on rotation of the same, are carried against a blade which slices them into two halves, a second carousel with a plurality of pairs of cells which each receive one of the two newly-cut half-oranges from the first carousel, a third carousel with two rotating groups of squeezer heads which rotate at the same time as, and simultaneously squeeze, the two half-oranges travelling in a pair of cells of the second carousel, and a pair of ejectors of the peel of the half-oranges squeezed, which penetrate through corresponding meridian slots in the squeezer heads, on which the shafts of the second and third carousels are mounted in projection and with their free extremities immovably linked by a rigid clamp.

ES 2389890 T3 relates to a fruit juicer with a frame, on which parallel shafts are housed, on the one hand for two pressure cylinders operated in opposite directions, disposed on both sides of a blade, with hemispherical presser cut-outs distributed at the edge thereof, and on the other hand, for two pressure-plate heads which may be operated in a direction opposite to that of the pressure cylinders, foreseen below the pressure cylinders, bearing spherical pressure plates distributed at the edge and which collaborate with the presser cut-outs of the pressure cylinders, and a removable safety catch for the extraction of the pressure cylinders and the pressure plate heads axially coupled to their conical shafts, where the extraction safety catch comprises axial stop tabs, rotationally housed on a common support, for the pressure cylinders and the pressure plate heads, and where the support is linked to the frame detachably in the direction of the shafts.

Said proposals enable the obtaining of fruit juicing machines which satisfactorily perform their principal function, but in some cases they include additional components which might cause issues such as breakages, losses during assembly and disassembly, the appearance of hollows with dirt, etc.

SUMMARY OF THE INVENTION

Thus, the object of the present invention is to provide a squeezer unit enabling the elimination of the drawbacks of the prior art.

The invention provides a squeezer unit, comprising:
two female drums with a central shaft, which can rotate in opposite directions, comprising a number of cavities to house a fruit to be squeezed,
two male drums with a central shaft, located below the female drums, in such a way that each male drum can rotate in a direction opposite to that of the corresponding female drum above the same, the male drums featuring a number of protrusions which can couple with the cavities of the female drums to extract the juice,
a support for the squeezer unit comprising a frontal plate which may be coupled to the male drums and the female drums,
where each of the female drums and the male drums comprises a frontal extension which is coaxial with its central axis, each extension being integral with the body of the corresponding drum, and the frontal plate of the support of the squeezer unit comprises, on its side facing the female drums and the male drums, four protrusions, in such a way that in the assembled position of the squeezer unit the extensions of the female drums and the male drums couple with the corresponding protrusions of the frontal plate of the support.

The invention also provides a fruit juicing machine incorporating said squeezer unit.

By means of this configuration of the squeezer unit, the inclusion of additional components such as stop tabs is avoided; these may cause the appearance of dirt or remains of fruit in the space located between said component and its shaft.

Another advantage of the invention is that with the configuration proposed, a more robust squeezer unit is achieved, while reducing the number of components.

Another advantage of the invention is that it reduces the tendency to splay of the shafts or axles of the juicer machine to which the squeezer unit is fitted.

Other features and advantages of the present invention will be inferred from the following detailed description of an illustrative embodiment of its object in relation to the accompanying figures.

BRIEF DESCRIPTION OF THE DRAWINGS

What follows is a non-limiting illustration of the object of the present invention, making reference to the accompanying drawings, wherein.

DETAILED DESCRIPTION OF THE INVENTION

Figure 1:
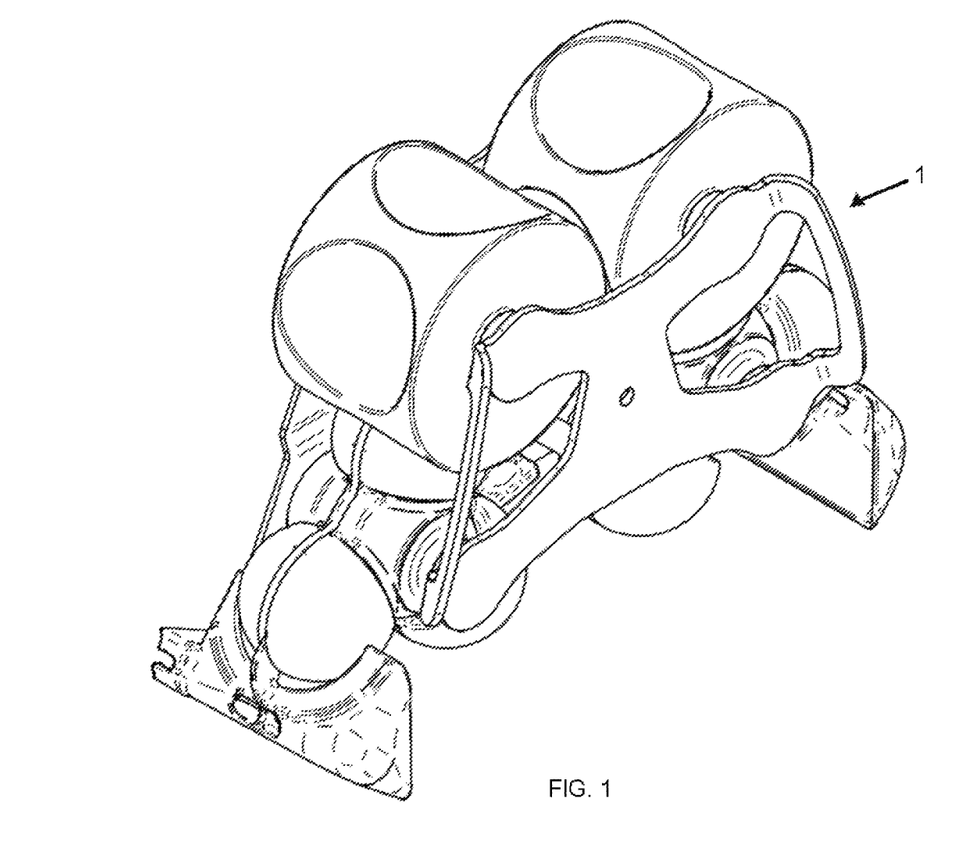
FIG. 1 portrays a perspective view of the squeezer unit of the invention.
Figure 2:
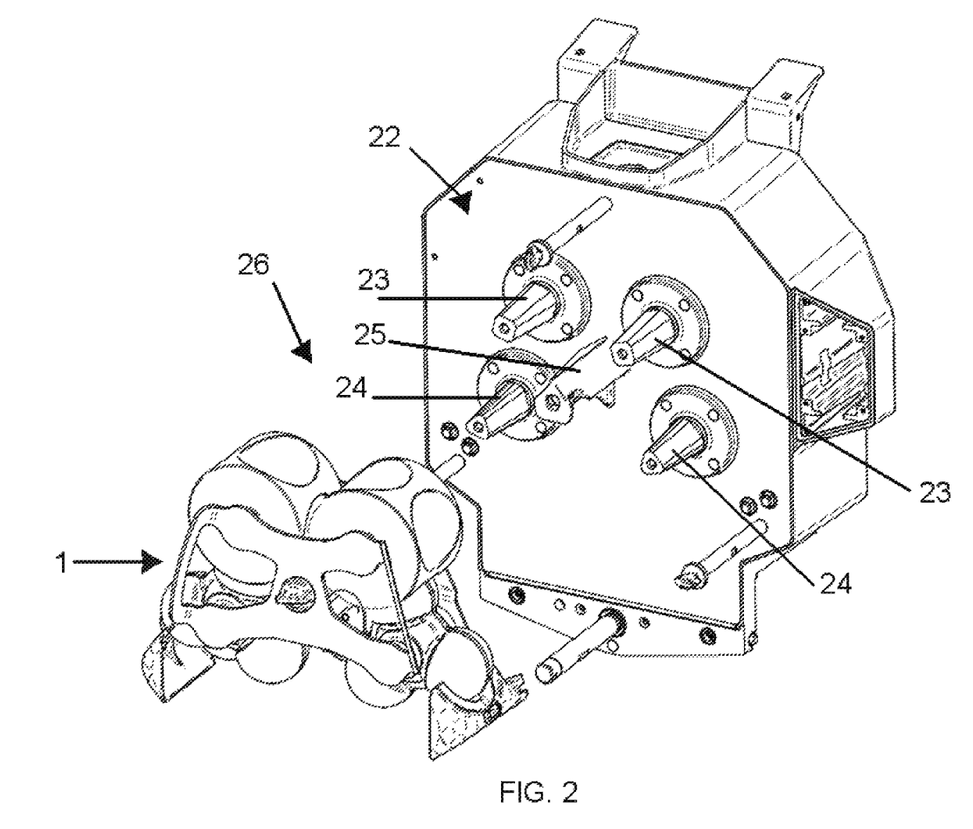
FIG. 2 portrays a perspective view of a fruit juicing machine with a squeezer unit as in FIG. 1, the squeezer unit being separated from the frame of the machine.
Figure 3:
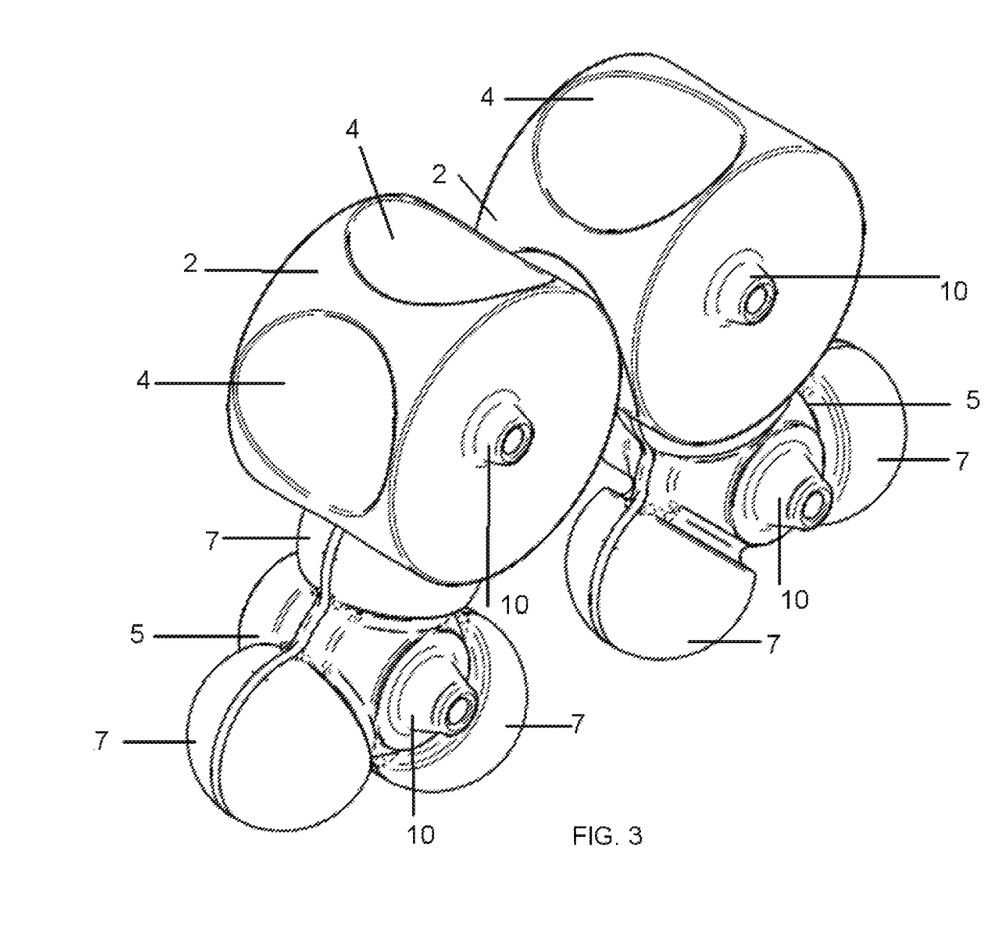
FIG. 3 portrays the drums of the squeezer unit in FIG. 1.
Figure 4:
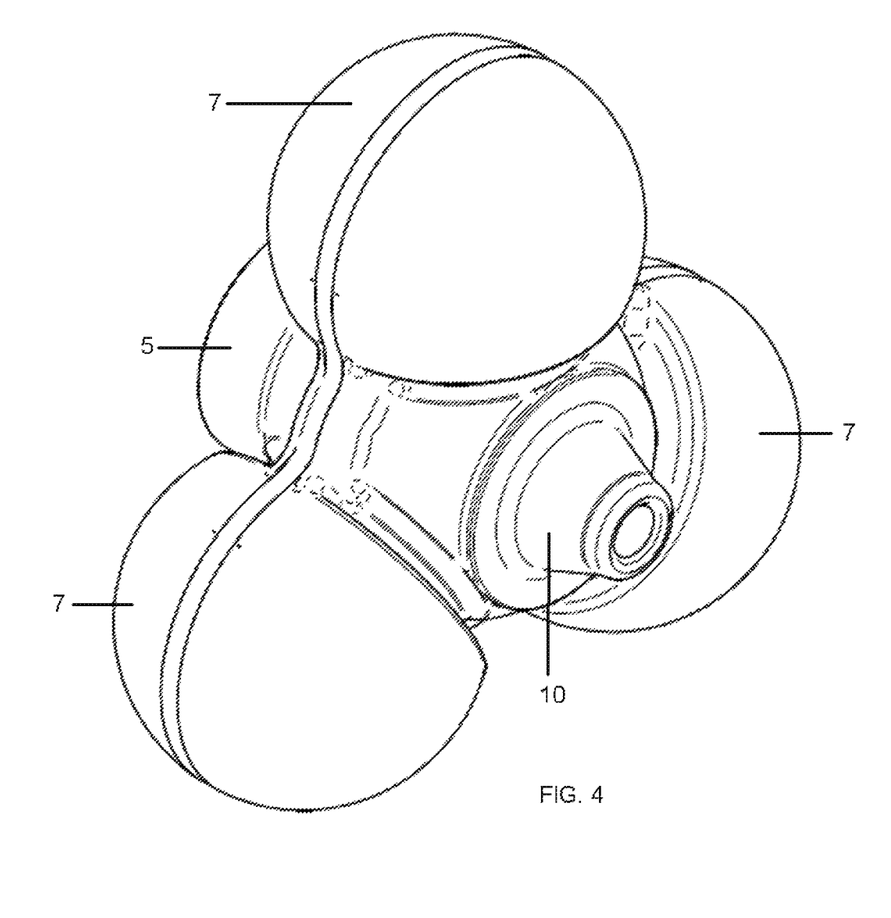
FIG. 4 portrays a male drum of the squeezer unit in FIG. 1.
Figure 5:
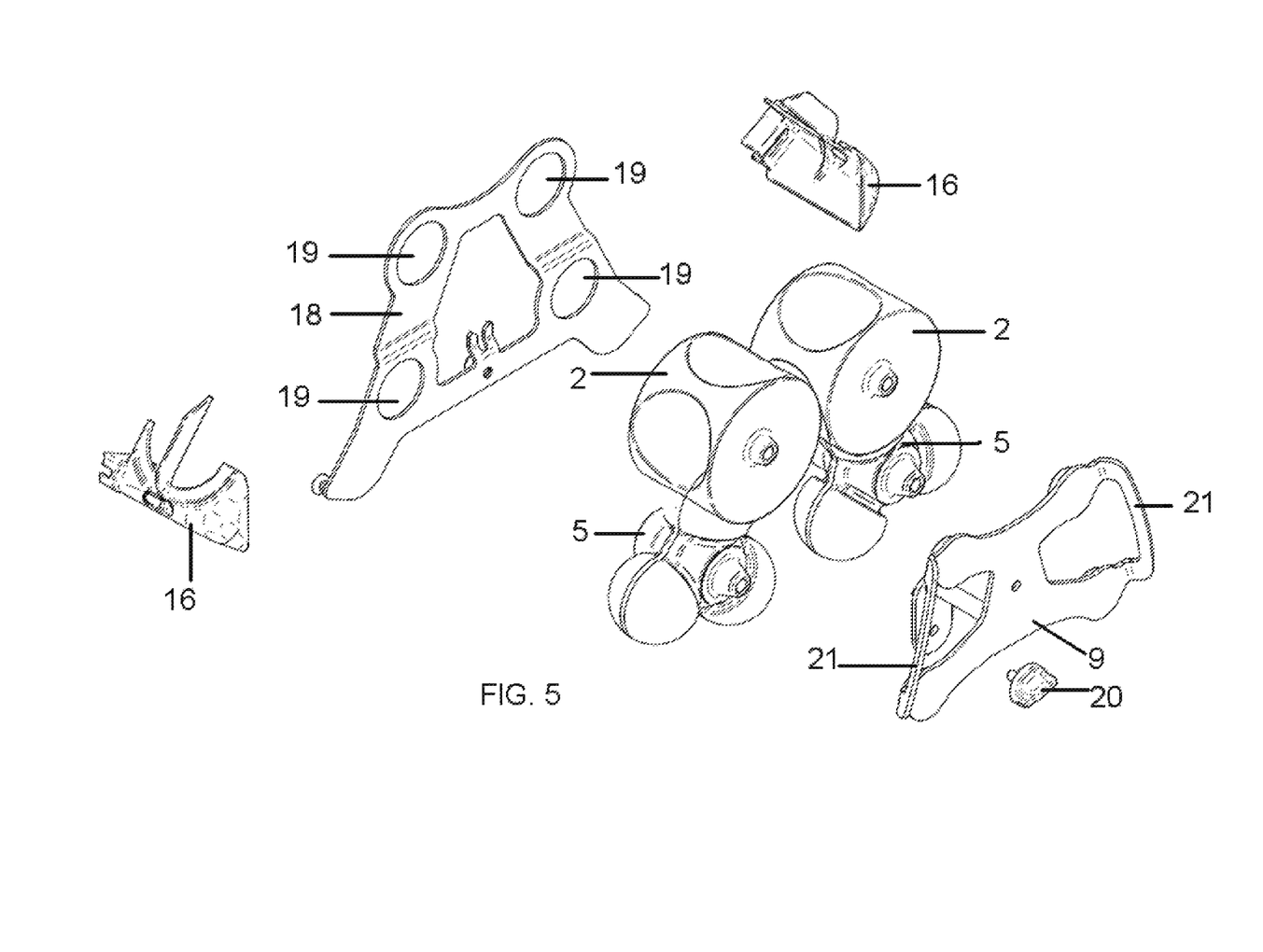
FIG. 5 portrays a front view of the elements of the squeezer unit in FIG. 1.
Figure 6:
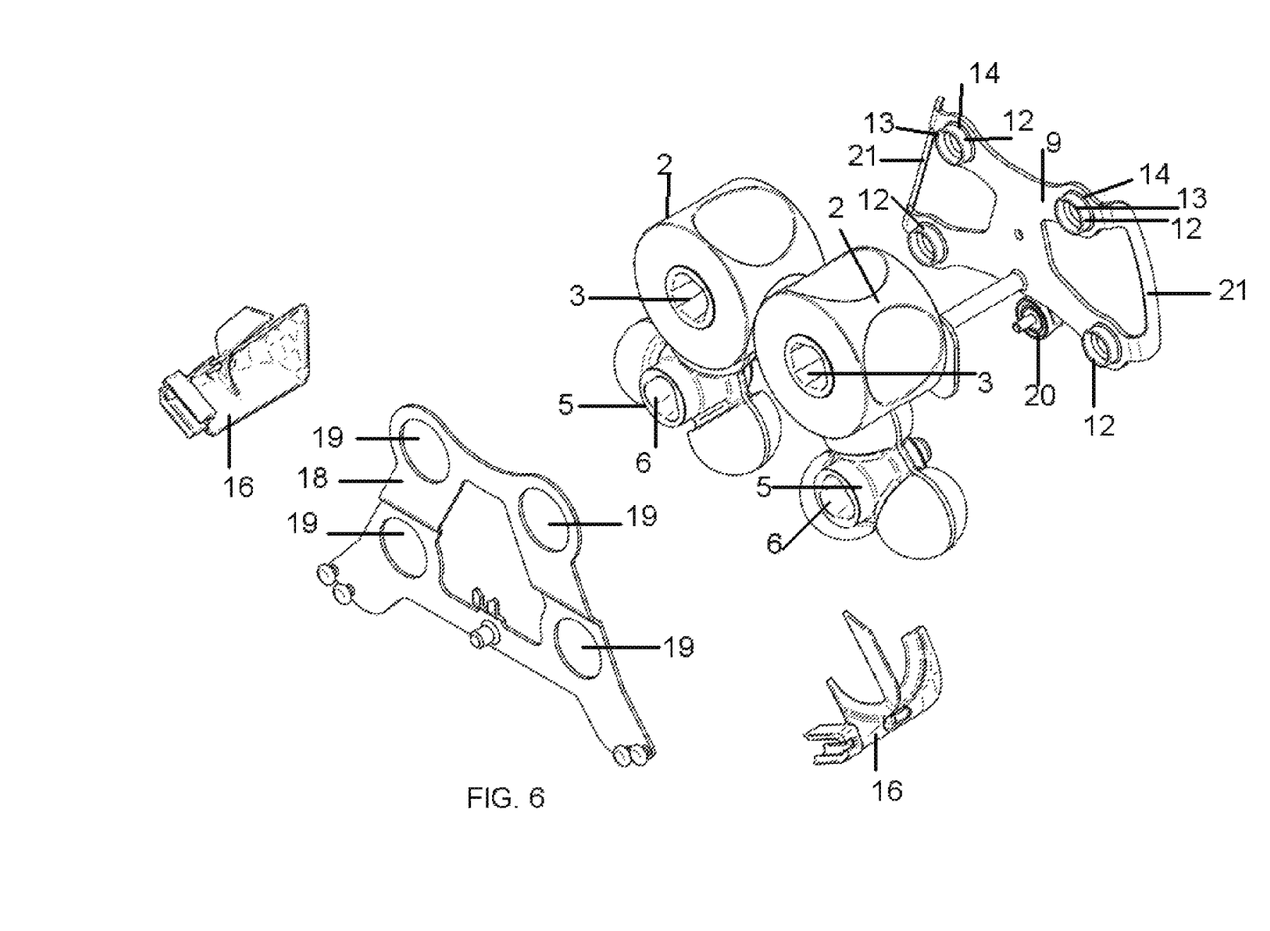
FIG. 6 portrays a rear view of the elements of the squeezer unit in FIG. 1.

FIG. 1 portrays a squeezer unit 1 according to one embodiment of the invention, and FIG. 2 portrays said squeezer unit 1 located facing the frame 22 of a fruit juicing machine 26.

"Squeezer unit" is understood to mean the set of components of the juicing machine in which the fruit is squeezed, and which form a unit which may be separated from the remainder of the juicing machine, e.g. for the cleaning thereof.

In this description, the "front side" is understood to be that which faces the user of the machine. For example, in FIG. 2 the front side of the frame 22 would be that marked by the arrow corresponding to said frame 22 (that is, that located in the forward position in said figure). Likewise, the front side of the squeezer unit 1 is that which faces the user of the juicing machine 26 once assembled (that is, in the forward position in FIGS. 1 and 2).

When the juicing machine 26 is to be used, the squeezer unit 1 is coupled to the front side of the frame 22 of said juicing machine 26. FIG. 2 portrays the position prior to said coupling or assembly.

The fruit juicing machine 26 which incorporates the squeezer unit 1 further comprises a frame 22 from which the following frontally protrude (see FIG. 2):
- two parallel shafts (23) for the female drums (2) of the squeezer unit (1), which can rotate in opposite directions,
- two parallel shafts (24) for the male drums (5) of the squeezer unit (1), located below the shafts (23) for the female drums (2), in such a way that each shaft (24) can rotate in a direction opposite to that of the corresponding shaft (23) located above the same, and
- a cutting blade (25) located between the two female drums (2) when the squeezer unit (1) is assembled on the frame (22).

The squeezer unit (1) of the embodiment (FIGS. 1, 3, 4, 5 and 6, for example) comprises:
- two female drums (2) with an internal cavity (3), with a central shaft, which can rotate in opposite directions, comprising a number of cavities (4) to house a fruit to be squeezed,
- two male drums (5) with an internal cavity (6), with a central shaft, located below the female drums (2), in such a way that each male drum (5) can rotate in a direction opposite to that of the corresponding female drum (2) located above the same, the male drums (5) comprising a number of protrusions (7) which can be coupled to the cavities (4) of the female drums (2) to squeeze out the juice,
- a support (8) for the squeezer unit (1) comprising a frontal plate (9) which can be coupled to the male drums (5) and the female drums (2), Each of the female drums 2 and the male drums 5 of the squeezer unit 1 features a frontal extension 10 which is coaxial with its central axis, each frontal extension 10 being integral with the body of the corresponding drum 2, 5, and the frontal plate 9 of the support 8 of the squeezer unit 1 comprises, on its side facing the female drums 2 and the male drums 5, four protrusions 12, 15 (FIGS. 7 and 8), in such a way that in the assembled position of the squeezer unit 1 the extensions 10 of the female drums 2 and the male drums 5 couple with the corresponding protrusions 12, 15 of the frontal plate 9 of the support 8.

The protrusions 7 of the male drums 5 may feature a shape complementary to that of the cavities 4 of the female drums 2. For example, they may feature a convex spherical shape, facing a concave spherical shape of the cavities 4.

The frontal extensions 10 of the female drums 2 and of the male drums 5 may feature a truncated conical shape (as may be seen in FIGS. 3 and 4, for example), but they may also feature other shapes (e.g. cylindrical).

Figure 7:
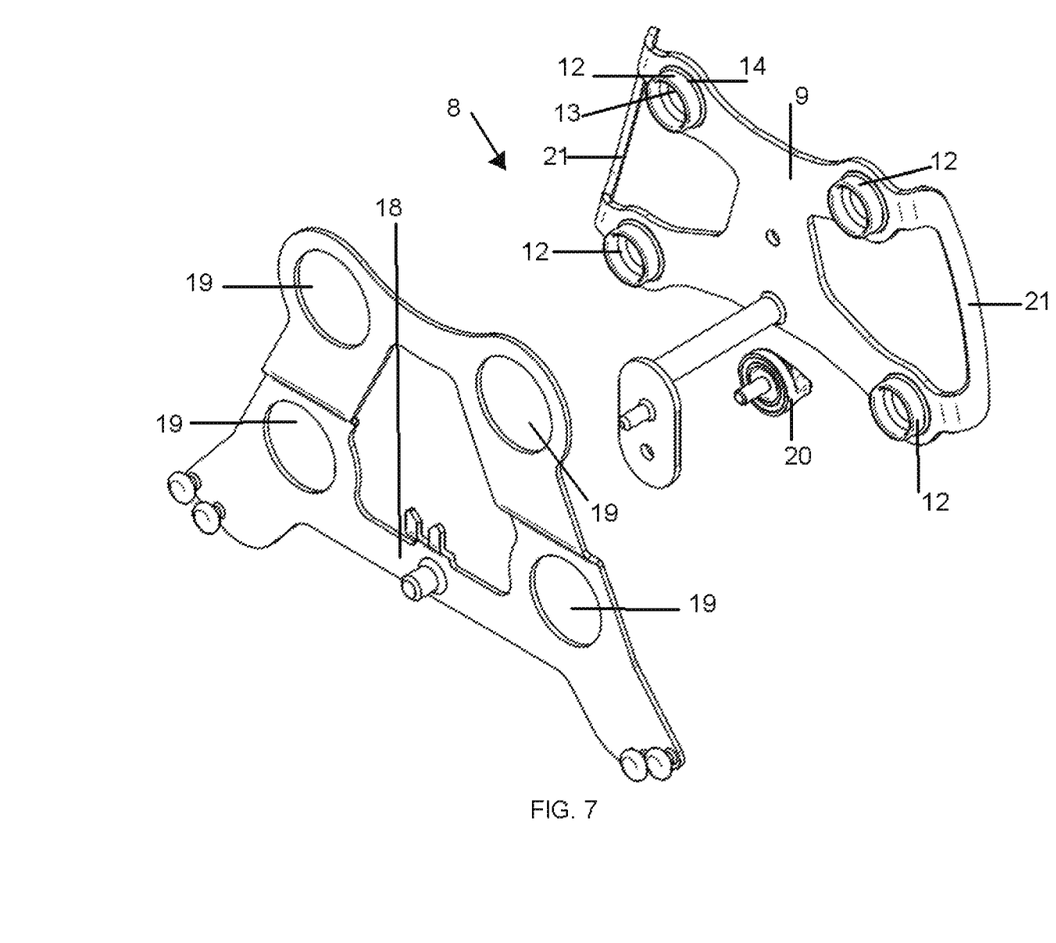
FIG. 7 portrays a view of the elements of one embodiment of the support for the squeezer unit in FIG. 1.

In FIG. 7 it may be seen that the protrusions of the frontal plate 9 of the support 8 of the squeezer unit 1 may be housings 12 with a hollow cylindrical shape. On coupling the frontal plate 9 to the female drums 2 and the male drums 5, the extensions 10 of said female drums 2 and male drums 5 couple within the housings 12 with a hollow cylindrical shape 8 (for example, as in FIG. 1).

Likewise, as may be seen in FIG. 7, the housings 12 of the frontal plate 9 of the support 8 may present a chamfered free edge 13, and the housings 12 of the frontal plate 9 of the support 8 may have a joint 14 to the frontal plate 9 in a chamfered manner, in order to prevent the accumulation of dirt and thus to improve the cleanliness in those areas.

Figure 8:
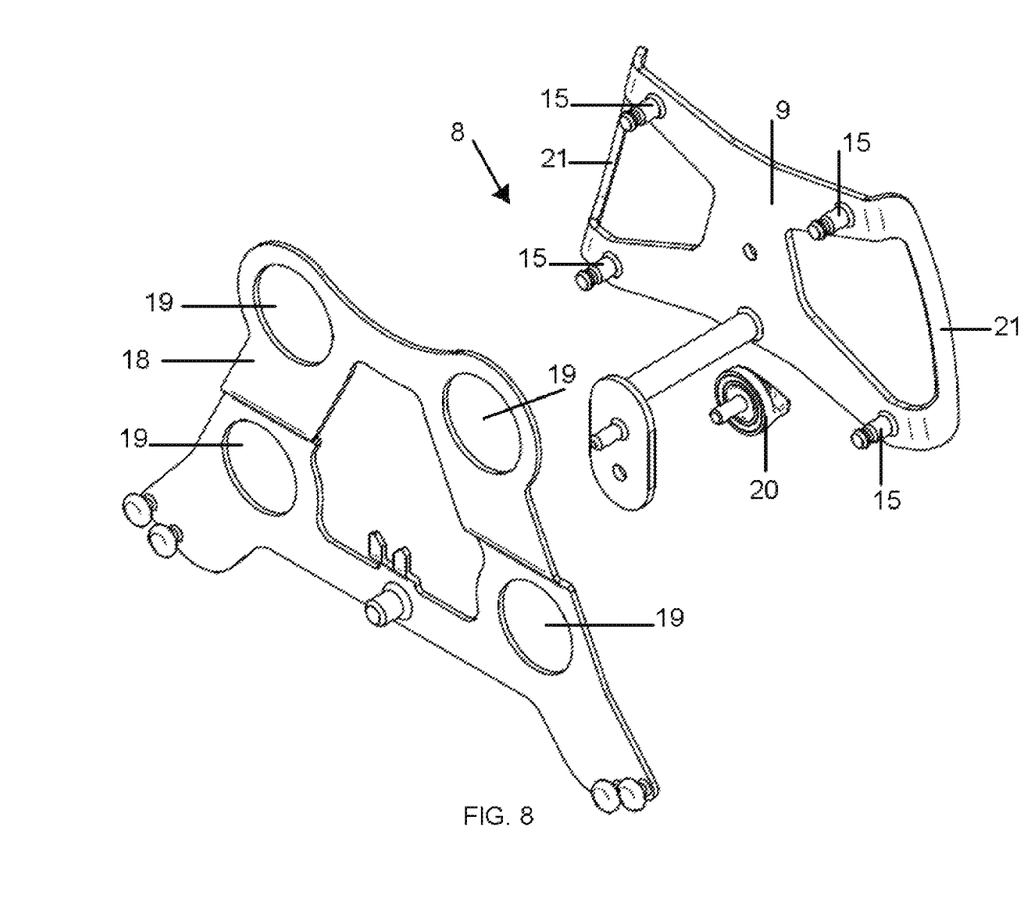
FIG. 8 portrays a view of the elements of another embodiment of the support for the squeezer unit in FIG. 1.

In FIG. 8 it may be seen that the protrusions of the frontal plate 9 of the support 8 of the squeezer unit 1 are shafts 15, directed inward (that is, toward the frame 22 in its assembled position). On coupling the frontal plate 9 with the female drums 2 and the male drums 5, these shafts 15 couple with the extensions 10 of said female drums 2 and male drums 5, being inserted into their respective internal cavities 3, 6.

In FIGS. 1, 2, 5 and 6 a number of lateral wedges 16 may be seen; these, being associated with the male drums 5, are for the extraction of the peel of the squeezed fruit.

Figure 9:
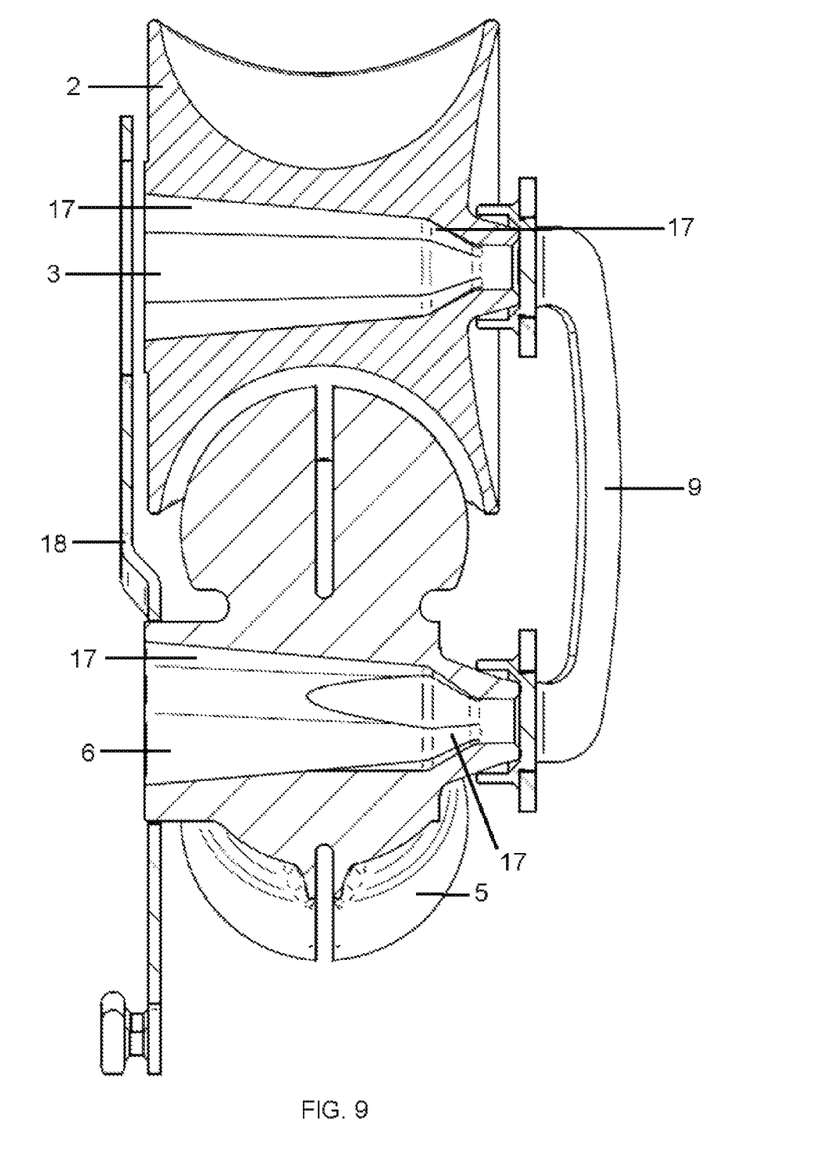
FIG. 9 shows a cross-sectional view of the squeezer unit in FIG. 1.

FIG. 9, which is a cross-sectional view of the squeezer unit 1 in FIG. 1, reveals that within the internal cavities 3, 6 of the female drums 2 and of the male drums 5 there is at least one truncated-conical section 17, and that said cavities 3, 6 narrow toward the frontal part of the squeezer unit 1.

The support 8 of the squeezer unit 1 may further comprise a rearward plate 18 (FIGS. 5-8) with a number of orifices 19 which, when the squeezer unit 1 is assembled, surround the corresponding central shafts and internal cavities 3, 6 of the female drums 2 and of the male drums 5, the male drums 5 and the female drums 2 being located between the frontal plate 9 and the rearward plate 18. The rearward plate 18 is attached to the frontal plate 9 by linking means.

The support 8 comprises removable linking means 20 which may be attached to the frame 22 of the juicing machine 26 to which the squeezer unit 1 is coupled.

Likewise, the frontal plate 9 of the support 8 of the squeezer unit 1 may comprise lateral handles 21 to facilitate the grasping of the squeezer unit and its removal, when applicable.

Any modifications comprised within the scope defined by the following claims may be made to the preferred embodiments of the invention described above.

The invention claimed is:

1. A squeezer unit (1), comprising:
   two female drums (2) with an internal cavity (3), with a central shaft, which can rotate in opposite directions, comprising a number of cavities (4) to house a fruit to be squeezed,
   two male drums (5) with an internal cavity (6), with a central shaft, located below the female drums (2), in such a way that each male drum (5) can rotate in a direction opposite to that of the corresponding female drum (2) located above the same, the male drums (5) comprising a number of protrusions (7) which can be coupled to the cavities (4) of the female drums (2) to squeeze out the juice,
   a support (8) for the squeezer unit (1) comprising a frontal plate (9) which can be coupled to the male drums (5) and the female drums (2),
   wherein
   each of the female drums (2) and the male drums (5) features a frontal extension (10) which is coaxial with its central axis, each frontal extension (10) being integral with the body of the corresponding drum (2, 5), and the frontal plate (9) of the support (8) of the squeezer unit (1) comprises, on its side facing the female drums (2) and the male drums (5), four protrusions (12, 15) in such a way that in the assembled position of the squeezer unit (1) the extensions (10) of the female drums (2) and the male drums (5) couple with the corresponding protrusions (12, 15) of the frontal plate (9) of the support (8); and,
   wherein, the frontal extensions (10) of the female drums (2) and the male drums (5) feature a truncated conical shape.

2. A squeezer unit (1) as claimed in claim 1, where the frontal extensions (10) of the female drums (2) and the male drums (5) feature a cylindrical shape.

3. A squeezer unit (1) as claimed in claim 1, where the protrusions of the frontal plate (9) of the support (8) of the squeezer unit (1) are housings (12) with a hollow cylindrical shape.

4. A squeezer unit (1) as claimed in claim 3, where the housings (12) of the frontal plate (9) of the support (8) have a chamfered free edge (13).

5. A squeezer unit (1) as claimed in claim 1, where the housings (12) of the frontal plate (9) of the support (8) have their joint (14) to the frontal plate (9) in a chamfered manner.

6. A squeezer unit (1) as claimed in claim 1, where the protrusions of the frontal plate (9) of the support (8) of the squeezer unit (1) are shafts (15).

7. A squeezer unit (1) as claimed in claim 1, which further comprises a number of lateral wedges (16) associated with the male drums (5) for the extraction of the peel of the squeezed fruit.

8. A squeezer unit (1) as claimed in claim 1, where the internal cavities (3, 6) of the female drums (2) and the male drums (5) comprise at least one truncated-conical section (17) and narrow toward the frontal part of the squeezer unit (1).

9. A squeezer unit (1) as claimed in claim 1, where the support (8) further comprises a rearward plate (18) with a number of orifices (19) which, when the squeezer unit (1) is assembled, surround the corresponding central shafts and the internal cavities (3, 6) of the female drums (2) and of the male drums (5), the male drums (5) and the female drums (2) being located between the frontal plate (9) and the rearward plate (18).

10. A squeezer unit (1) as claimed in claim 1, where the support (8) comprises removable linking means (20) which may be attached to a frame (22) of the juicing machine (26) to which the squeezer unit (1) is coupled.

11. A squeezer unit (1) as claimed in claim 1, where the frontal plate (9) of the support (8) of the squeezer unit (1) comprises lateral handles (21).

* * * * *